R. McCLENATHEN AND J. NOALL.
FABRIC SMOOTHING MACHINE.
APPLICATION FILED MAY 14, 1920.

1,377,212.

Patented May 10, 1921.
6 SHEETS—SHEET 2.

INVENTOR
Robert McClenathen
John Noall.
BY
Chas W Stapleton
ATTORNEY

UNITED STATES PATENT OFFICE.

ROBERT McCLENATHEN, OF CUYAHOGA FALLS, AND JOHN NOALL, OF AKRON, OHIO, ASSIGNORS TO KELLY SPRINGFIELD TIRE CO.

FABRIC-SMOOTHING MACHINE.

1,377,212. Specification of Letters Patent. Patented May 10, 1921.

Application filed May 14, 1920. Serial No. 381,468.

*To all whom it may concern:*

Be it known that we, ROBERT MCCLENA-THEN, a citizen of the United States, residing at Cuyahoga Falls, Summit county, and State of Ohio, and JOHN NOALL, a citizen of the United States, residing at Akron, Summit county, and State of Ohio, have invented new and useful Improvements in a Fabric-Smoothing Machine, of which the following is a specification.

Manufacturers of rubber articles, especially rubber tires, use large quantities of unvulcanized sheeted rubber and a fabric coated with unvulcanized rubber which are soft and sticky and are usually handled by placing the same between strips of clean cotton cloth such as the familiar white sheeting. These strips are usually several hundred feet in length, are known to the trade as "liners" and are usually carried wound up on large spools or reels, sometimes wound up with the rubber in alternate layers and sometimes without the rubber, as they are unwound and the rubber taken out they are usually rewound upon corresponding spools, when wound up with the rubber they are referred to as "filled liners" and without the rubber as "empty liners." They are used over and over again many times. In handling and rewinding, these liners frequently become wrinkled causing corresponding wrinkles in the sheeted rubber making it defective and unfit for many uses. These wrinkles have usually been smoothed out by hand, involving much trouble and expense and this process even with the utmost care does not always eliminate all of the wrinkles. To remedy this, we have invented a winding-up machine the principal features of which are to cause the empty and wrinkled liners to come in moving contact with rollers equipped with diverging spiral ridges or threads disposed so that as the ridges revolve in contact with the empty liner they push all parts of the liner from the center outward simultaneously as they are wound up upon the receiving or storing spool.

Frequently only one edge of these liners is a selvage, and in such cases they tend to run unevenly over the smoothing rollers, that is, the selvage edge will stretch less readily than the other, and to compensate for this inequality we mount the smoothing rollers so that the outer ends are vertically adjustable and mount the feeding spool so that it is laterally adjustable and by suitable mechanism procure a coöperation of the smoothing rollers and feeding spool to take care of any uneven stretching or feeding in the liner whether resulting from the selvage edge or otherwise.

Another feature of the machine is mechanism which produces a constant velocity in the moving liner which is accomplished by an automatic reduction of the speed of the receiving spool as it fills up and increases in size with the layers of liners deposited thereon. A large number of these liners are in common use in all rubber factories.

As our invention takes the liner from one spool and winds it upon another duplicate spool, for convenience we will refer to the first mentioned as the feeding spool and the other as the receiving spool. It will be understood that these spools are duplicates and usable either as a feeding or receiving spool on our machine.

Referring to the drawings.

Like numerals and letters refer to like parts in all figures.

Figures 7, 8, 9, 10, 11, 12:
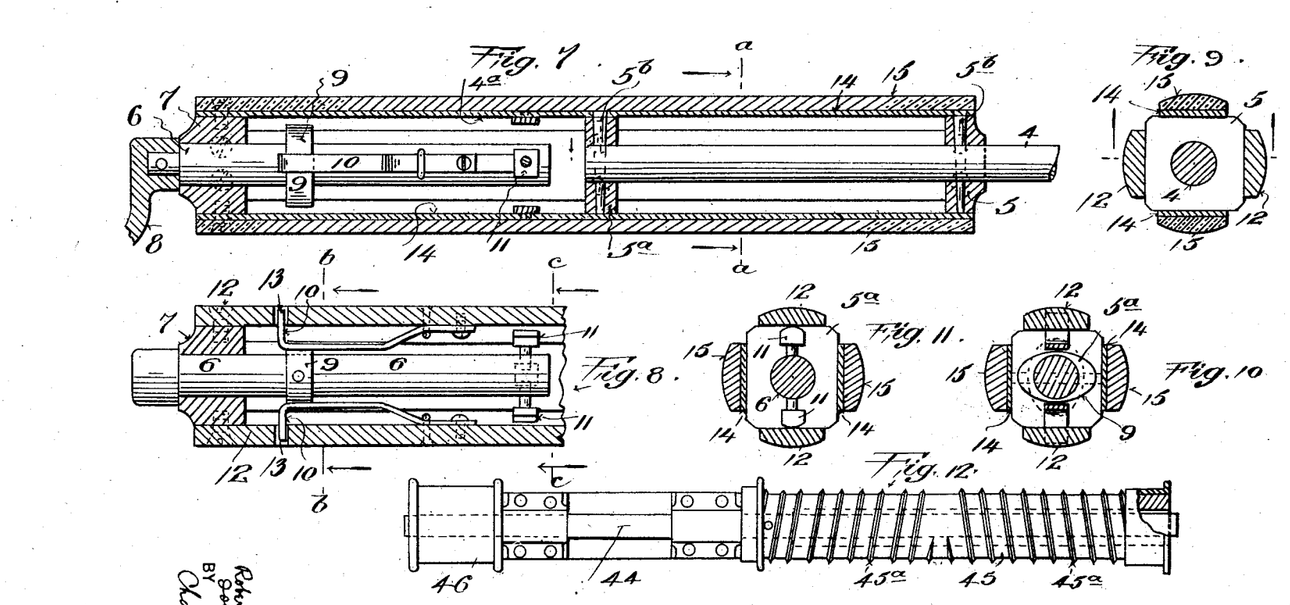
Fig. 7, is a longitudinal section of an expandible bearing on which the feeding spool revolves in friction contact.
Fig. 8, is a longitudinal portion of the bearing shown in Fig. 7, taken at right angles to Fig. 7.
Fig. 9, is a cross section of the feeding spool bearing taken on line a—a of Fig. 7.
Fig. 10, is a cross section of the expandible feeding spool bearing taken on line b—b of Fig. 8.
Fig. 11, is a cross section of feeding spool bearing taken on line c—c of Fig. 8.
Figs. 12, and 13, are top plan views of the smoothing rollers having spiral ridges or threads.
Figure 13:
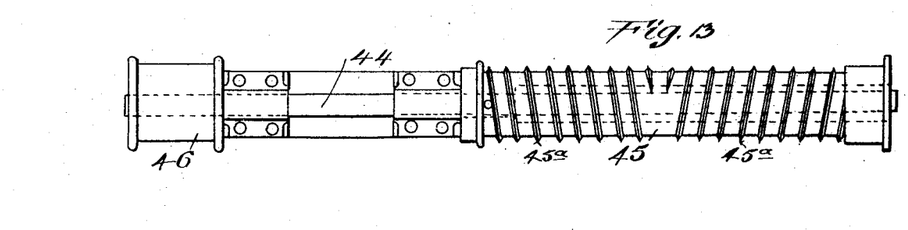

To the standard 1 is rigidly attached horizontal bed piece 2 with an extension 3 on which extension is located slidable arm 4 one end of which arm is covered and extended by expandible metal and leather strips constituting a casing 4ª. The casing 4ª, really consists of an inner and outer section, the inner section being rigidly attached to slidable arm 4 by means of rectangular bearing blocks 5, 5ª, and pins 5ᵇ. The outer section is equipped internally with a center shaft 6 revolubly supported by bearing 7 to which shaft is attached handle 8 also an elliptically shaped cam 9 (best shown in Fig. 10) which contacts with spring-lugs 10 and also two square headed bolts 11 with cylindrically rounded heads (best shown in Fig. 11) which are adjustably screwed into shaft 6 opposite each other.

Rigidly attached to the bearing blocks 5, 5ª, and bearing 7 are two metal supporting strips 12, having slots 13 to allow operation of the free ends of spring-lug 10, also rigidly attached to bearing 5 only, are two spring metal strips 14, of the same length and width as strips 12, and faced on the outside with strips of thick leather 15, firmly attached thereto. Said metal strips 12, and leather strips 15, all having rounded exterior surfaces. The slidable arm 4 with the casing 4ª constitutes a bearing or shaft to carry the feeding spool A from which spool the wrinkled liners are fed to the smoothing rollers.

Figure 4:
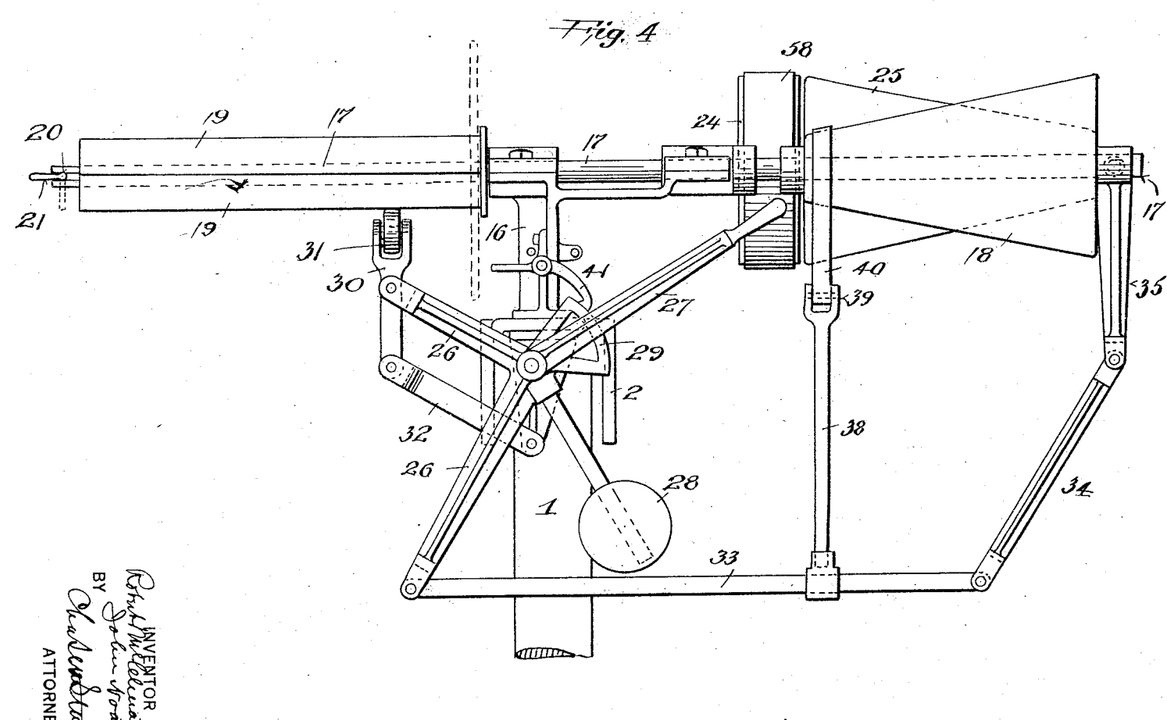
Fig. 4, shows details of cone mechanism to regulate the speed of the receiving spool so that the liner will move with constant velocity.
Figure 5:
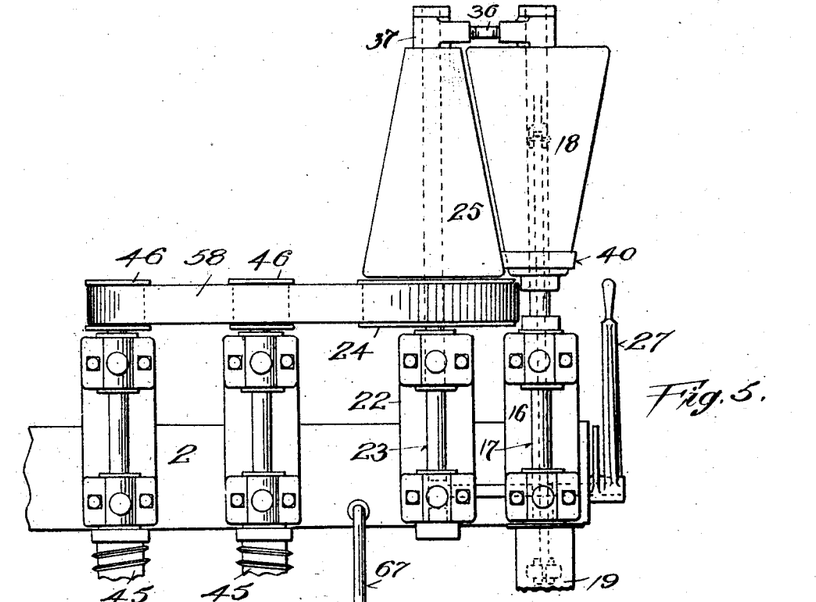
Fig. 5, is a plan view of a portion of the cone mechanism for regulating the speed of the receiving spool, also showing relative position of smoothing rollers.
Figure 6:
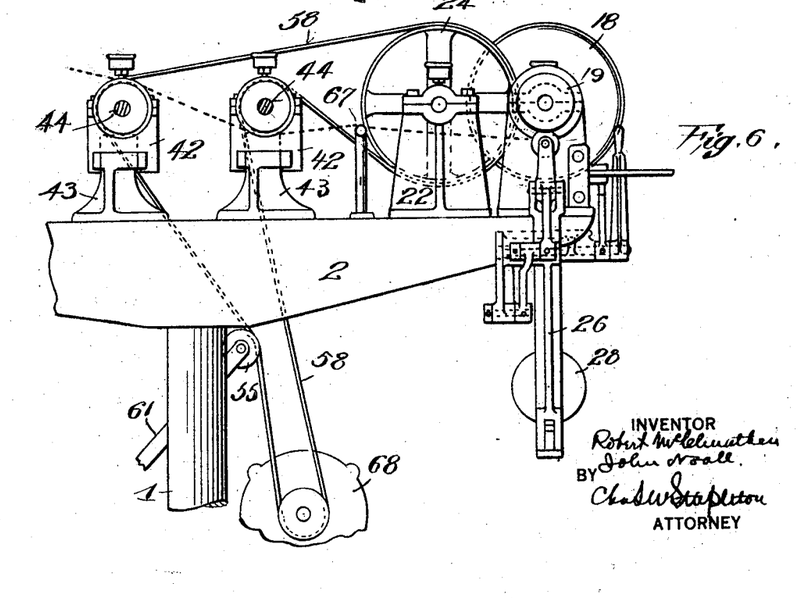
Fig. 6, is a side view of the mechanism for regulating the speed of the receiving spool and the adjacent parts of the machine.

On the end of the bed piece 2 opposite to extension 3, is located bearing bracket 16, in which revolves shaft or arbor 17, (best shown in Fig. 5), to which arbor is keyed cone shaped pulley 18. The other end of shaft 17 extends beyond the bearing bracket 16 a distance substantially equal to that of arm 4 plus its extended casing 4ª. This extended portion of arbor 17 is split or divided longitudinally resulting in two semi-circular halves, each section being externally covered with a comparatively thick cylindrical wooden case 19, which are rigidly attached thereto (best shown in Fig. 15). Near the outer end of shaft 17 is located an oval cam 20, operated by handle 21, Rigidly attached to bed piece 2 is a bearing bracket 22 in which revolves shaft 23 (best shown in Fig. 5,) to which shaft is keyed driven pulley 24 and cone shaped pulley 25. Bracketed to frame 2 is a bell-crank 26, (best shown in Fig. 4,) with handle 27, counterweight 28, and segment 29 attached; pivoted to the short arm of bell-crank 26 is supporting fork 30 carrying roller 31, the lower end of supporting fork 30 is pivotally connected by link 32 to bed piece 2. The long arm of bell-crank 26 is pivotally connected by means of bar 33, and link 34 with arm 35, which arm is supported by the end of arbor 17 and is connected with shaft 23 by toggle 36 and bearing 37, (best shown in Fig. 5), belt-shifter 38 carries belt guide 39 controlling the lateral movements of friction driven belt 40 which contacts with cones 18 and 25; pivotally attached to bracket 16 is dog 41 in sliding engagement with segment 29.

Supported in roller bearings 42 which are hinged to bases 43 are two shafts 44 on one end of each of which is rigidly mounted a smoothing roller 45, each smoothing roller is equipped with two oppositely turned spiral ridges or threads, 45ª which spiral ridges are disposed so that the right hand twist on one roller comes opposite a left hand twist on the other roller; keyed to the other ends of shafts 44 are driven pulleys 46.

Figures 1, 14:
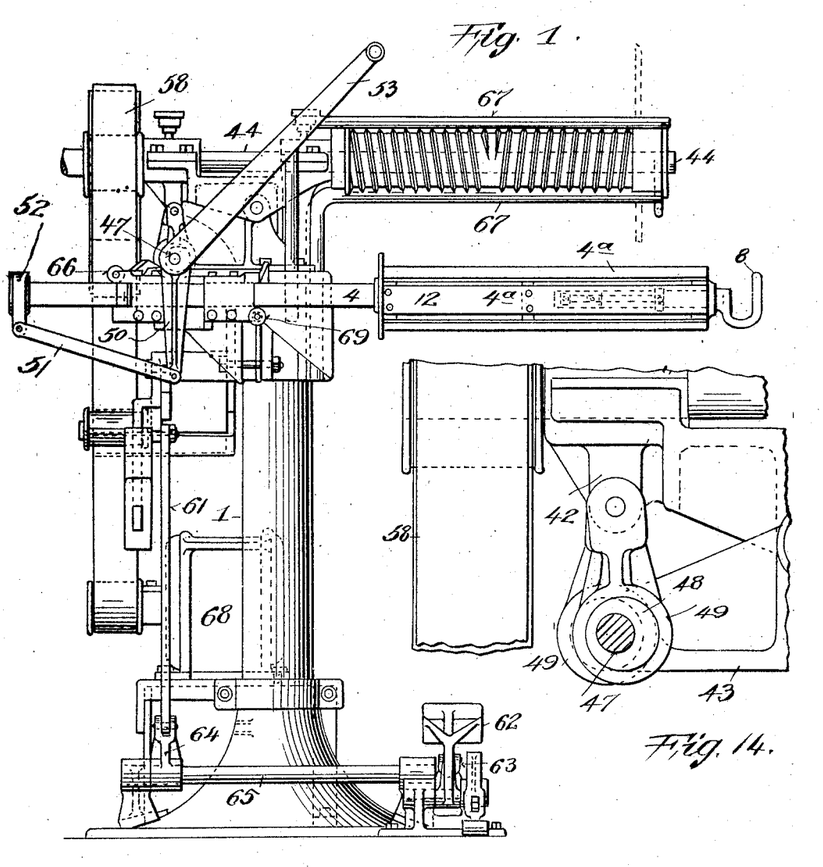
Figure 1, is a front view of the machine from the position of the operator, some parts omitted.
Fig. 14, shows eccentric mechanism for tilting or vertically adjusting the outer ends of the smoothing rollers.

Revolving in bases 43 is shaft 47 rigidly equipped with eccentrics 48 operating in eccentric link 49, (best shown in Fig. 14), which are pivotally connected with rocker bearing 42, and rigidly attached to shaft 47 is arm 50, (best shown in Fig. 1), connected by link 51 to arm 52 which arm is rigidly attached to the end of shaft 4. To shaft 47 is also rigidly attached crank 53.

Pivoted on bed piece 2 is an arm 54 (best shown in Fig. 3), carrying idler pulley 55, counterweight 56 and brake arm 57 (best shown in Fig. 3) which brake arm carries on its free end a friction belt compressor (shown but not numbered on the drawings) and which compressor registers with projecting flange 59 on the end of rigid hanger 60 and when depressed by the operation of foot lever 62 connecting links 66, 61 and their attachments (best shown in Fig. 2), operates to push belt 58 against projecting flange 59 and squeeze the belt between the two surfaces thus retarding or stopping the machine at the will of the operator. The bed piece 2, carries two guide arms 67 over which the fabric passes, these guide arms are adjustable vertically and are held at any desired height by set screws tapped into the frame of the machine as indicated by the dotted lines in Fig. 2.

Further details of the machine will be best understood by describing the operation.—The wrinkled liners are delivered to the machine wound up on feeding spool A which spool is revolubly mounted on the outer casing 4ª; the liner is then led over guide arm 67 and the first smoothing roller 45 and under the other and is attached to receiving spool B, which is rigidly mounted on wood covered arbor 17. When the feeding spool A is placed on the outer casing 4ª the handle 8 is given a ¼ turn which spreads the leather covered spring steel plates 14 by means of bolts 11 giving a controlling friction connection between the outer casing 4ª and the chamber walls of feeding spool A. This retards the revolution of spool A as it is revolved by the pulling off of the fabric, and regulates the tension on the liner. The turning of handle 8 also simultaneously forces out spring-lugs 10 by means of the elliptical shaped cam 9 which keeps the feeding spool A in place on the outer casing 4ª. When the receiving spool B is placed on wood covered arbor 17 the handle 21 is pulled down which turns oval cam 20, bringing divided shaft 17 into rigid contact with the chamber walls of receiving spool B. It will thus be understood that when the machine is in operation, feeding spool A, revolves on the outer casing 4ª but the outer casing 4ª does not revolve, but that wood covered arbor 17 does revolve and carries with it receiving spool B which is rigidly attached thereto. The effect of which is that receiving spool B, pulls the liner from feeding spool A over one smoothing roller and under the other, which smoothing rollers are in constant revolution. The liner also passes over horizontal guide arms 67 which are vertically adjustable and control the area of contact of the liner with the smoothing rollers 45.

The feeding and receiving spools being in position, one end of the liner is carried by hand over to the receiving spool and a couple of winds made thereon, the operator then trips dog 41 which allows roller 31 to contact with the wound up liner on spool B; the machine is then started and as the layers of liner increase on spool B, roller 31 is gradually pushed down, and through its connections moves bar 33 which in turn moves belt-shifter 38 and belt 40 on cone shaped pulley 18 toward the larger end thereof, the effect of which is to gradually lessen the speed of arbor 17 so that the liner is automatically kept at a constant velocity.

The belt 40 is of relatively stiff material and of sufficient length so that it hangs loosely over cone 18 and loosely in belt guide 39 and considerably below the retaining pin shown in dotted lines in belt guide 39, and when in operation at the small end of cone 18 forms a sort of flying loop. This surplus length permits the movement of the belt toward the large end of cone 18 as it is carried by the movement of belt guide 39.

To keep the liner running evenly to spool B, crank 53 is turned to the right which operates the eccentrics 48 and eccentric links 49 the effect of which is to elevate the outer end of one of the smoothing rollers and simultaneously depress the end of the other, and turning the crank to the left of course has the opposite effect. The movement of crank 53 also simultaneously operates arm 4 which slides on roller bearings 69, which operation moves feeding spool A horizontally, thus the tilting of the ends of the smoothing rollers and horizontal adjustment of the feeding spool, at the will of the operator coöperate to feed the liner evenly to receiving spool B, regardless of uneven stretching or wrinkled surface of the liner.

The spiral ridges are so disposed on the smoothing rollers that as they revolve in contact with the liner they push all parts of the liner from the center outward thus smoothing out all wrinkles and presenting a perfectly smooth fabric to be wound up on the receiving spool and as one smoothing roller is above and the other below the moving liner, both sides get the full effect of the ironing-out tendency of the spiral ridges.

Figures 2, 15, 16:
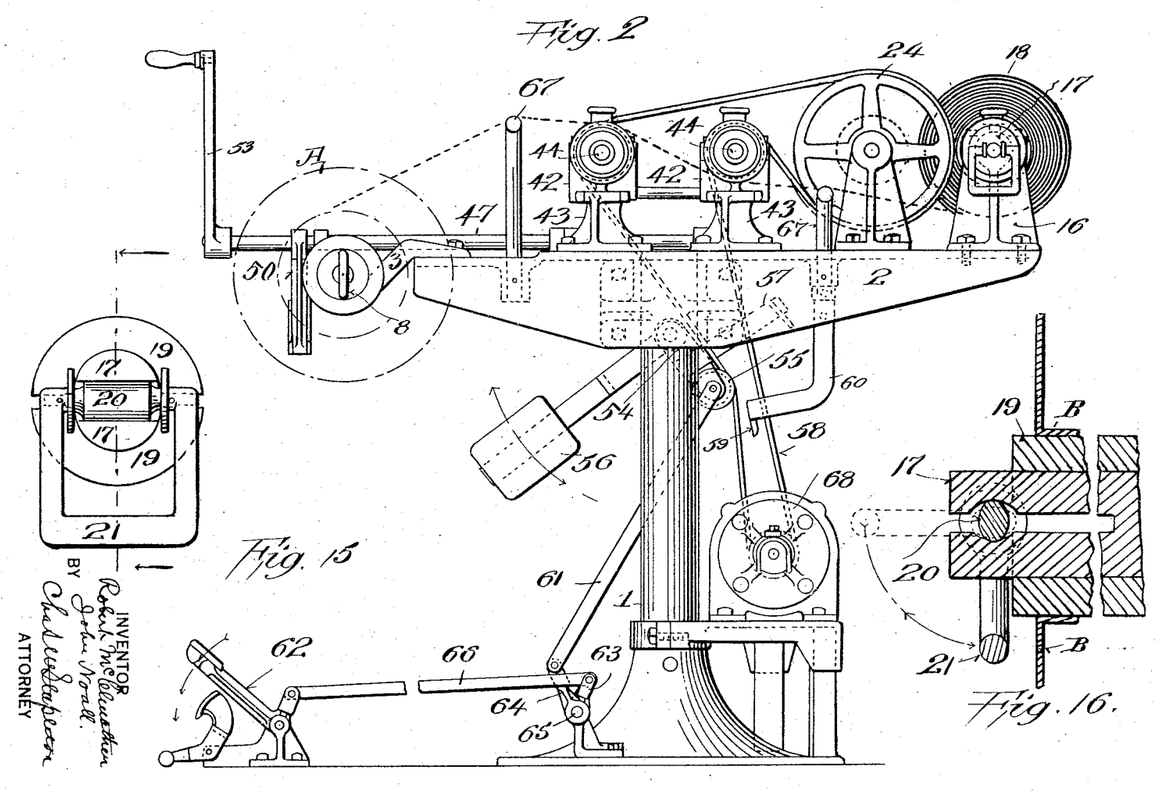
Fig. 2, is a view of a portion of the right hand side of the machine from the position of the operator, some parts omitted.
Fig. 15, is an end view of an oval cam which operates to spread the split receiving spool arbor, to insure rigid contact of the shaft with the chamber of the receiving spool.
Fig. 16, is a longitudinal section of the split receiving spool arbor and oval cam shown in Fig. 15.
Figures 3, 17, 18:
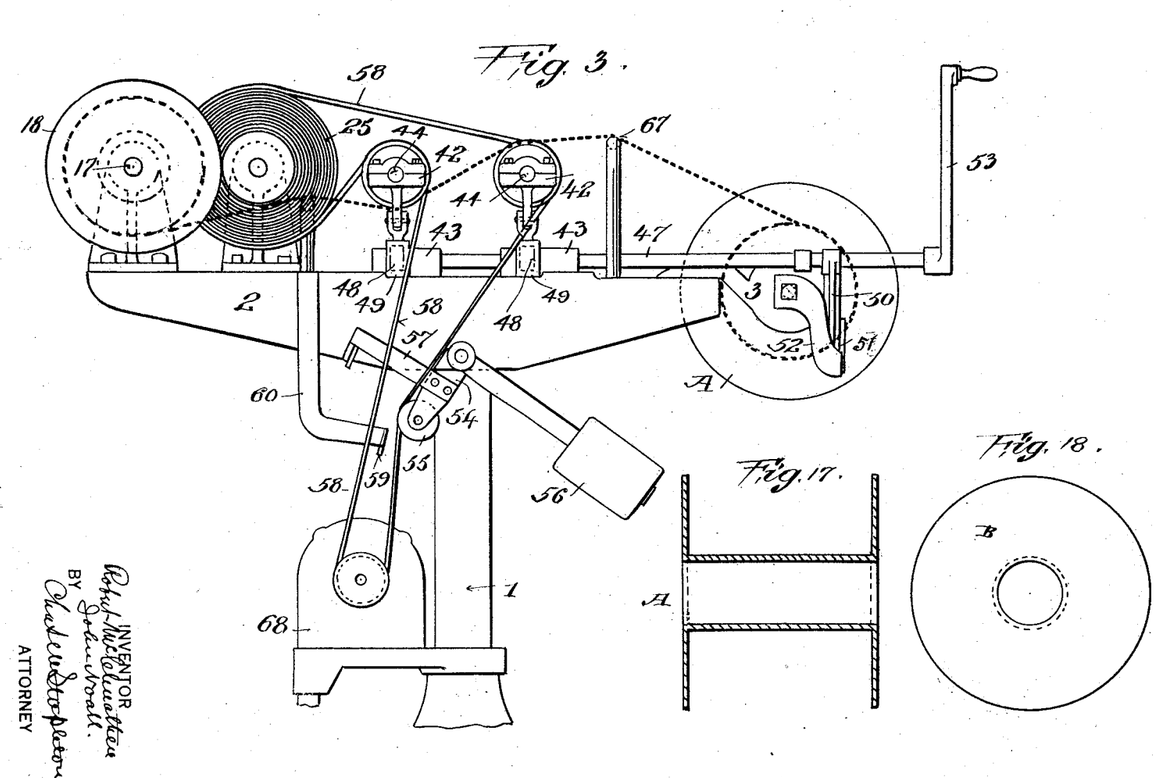
Fig. 3, is a view of a portion of the side opposite to that shown in Fig. 2, some parts omitted.
Fig. 17, shows a longitudinal section of a spool in common use for carrying and storing liners.
Fig. 18, is an end view of the spool shown in Fig. 17.

The broken lines in Figs. 2 and 3 show the path of the liner.

The machine and the operation thereof above described moves the liner at a constant velocity as the speed of the receiving spool is automatically retarded as the wound up liner increases in thickness on the receiving spool. If for any purpose it is desired to have the velocity of the fabric increase as it is wound up on spool B, cone shaped pulleys 18 and 25, roller 31, bell-crank 26 and its attachment may be eliminated and the driving belt carried directly to a driven pulley mounted on the end of arbor 17, we prefer however, to have the liner move at a constant velocity.

Having described our invention, we claim:—

1. In a machine of the character described, a slidable supporting arm having one free end equipped with an expandible casing adapted to support a revolving feeding spool, a rotatably mounted arbor having one free end equipped with an expandible casing adapted to carry and revolve a receiving spool, the other end of said arbor equipped with a speed regulating cone pulley, a pair of revoluble smoothing rollers located between said supporting arm and said arbor, means to revolve said cone pulley, and also said smoothing rollers in association with a moving cloth liner.

2. In a machine of the character described, a slidably mounted supporting arm having one free end adapted to support a revolving feeding spool, a rotatably mounted arbor having one free end equipped with an expandible casing adapted to carry and revolve a receiving spool, the other end of said arbor equipped with a speed regulating cone pulley operable at variable speed through connection with a companion cone pulley, a pair of revoluble smoothing rollers located between said supporting arm and said arbor, means to revolve said arbor, said cone pulleys, and said smoothing rollers in association with a moving cloth liner.

3. In a machine of the character described, a slidable supporting arm, a rotatably mounted arbor, said arm and said arbor each having an expandible casing attached thereto, a pair of tiltable, externally corrugated smoothing rollers, each roller having one free end, means to revolve said arbor and to revolve said smoothing rollers in contact with, and on opposite sides of a moving cloth liner.

4. In a machine of the character described, a horizontal supporting arm adapted to slide, having one free end, said free end equipped with an expandible bearing, a revoluble arbor having one free end adapted to support and revolve a receiving spool, the other end equipped with a cone pulley adapted to revolve at variable speed in association with a companion cone pulley, a pair of independent smoothing rollers each having a free projecting end, each roller equipped with spiral ridges on the face thereof, means to revolve said smoothing rollers in opposite direction in contact with, and on opposite sides of a moving cloth liner.

5. In a machine of the character described, a slidable supporting arm, a revoluble arbor, said arm and said arbor each having a free end on which is mounted an expandible casing, a pair of independent tiltable smoothing rollers equipped with external spiral ridges, means to revolve said smoothing rollers and to tilt the same while in contact with, and on opposite sides of a moving cloth liner.

6. In a machine of the character described, a slidable supporting arm, a revoluble arbor, said arm and said arbor being mounted at one end only and each having an expandible casing attached to its free end, two independent rotatably mounted and tiltable smoothing rollers, equipped with external, oppositely turned spiral ridges, and adapted to a tilting movement, means to revolve said smoothing rollers and to tilt the same, while they are revolving.

7. In a machine of the character described, a slidable supporting arm, a revoluble arbor, said arm and said arbor each having an expandible casing attached thereto, two independent rotatably mounted smoothing rollers, each roller having a free end, and each equipped with external and oppositely turned spiral ridges, and being adapted to a tilting movement while revolving, means to revolve said smoothing rollers in opposite directions, and to tilt the same while in contact with a moving cloth liner.

8. In a machine of the character described, a slidable supporting arm having one free end and an expandible outer casing attached to said free end and adapted to support a revolving feeding spool, a revoluble arbor adapted to support and revolve a receiving spool, two tiltable and revoluble smoothing rollers having external oppositely turned spiral ridges, means to cause a cloth liner to unwind from said feeding spool and to pass in contact with said smoothing rollers to said receiving spool and to be wound thereon as a continuous operation, means to revolve said smoothing rollers and receiving spool and to tilt said smoothing rollers while in operation.

9. In a machine of the character described, a slidable arm carrying on one end a casing adapted to radial expansion, means to expand said casing and to hold a feeding spool in revoluble frictional contact therewith, a revoluble arbor adapted to carry a receiving spool and means to hold a receiving spool rigidly upon said arbor, a pair of smoothing rollers, each having one free end and each being externally equipped with spiral ridges, said rollers being mounted pivotally and adapted to a tilting movement while in operation, means to drive said arbor at variable speed and to revolve and tilt said smoothing rollers in opposite directions while in contact with a moving cloth liner.

10. In a machine of the character described, a supporting arm adapted to lateral movement having one free end and that free end equipped with an expandible casing adapted to carry a revolving liner spool in frictional contact therewith and means to expand said casing, a revoluble arbor having a divided and radially expandible portion and adapted to carry and revolve a liner spool fixed thereon and means to expand said divided portion, a pair of revoluble smoothing rollers each roller equipped with oppositely turned spiral ridges and adapted to a vertical tilting movement, means to operate said arbor, supporting arm and smoothing rollers and to tilt said smoothing rollers all in coördination.

11. In a machine of the character described, a horizontally adjustable supporting arm having an expandible casing, and means to expand said casing, a supporting arbor equipped with a cone pulley on one end, the other end of said arbor adapted to support and revolve a receiving spool, a pair of associated cone pulleys, a pressure roller adapted to automatic adjustment in contact with the wound up surface of a cloth liner, mechanism connected with said pressure roller adapted to automatically regulate the velocity of said cone pulleys and means to operate said arbor and cone pulleys in coördination.

12. In a machine of the character described, a horizontally adjustable supporting arm having an expandible casing adapted to carry a revolving feeding spool, a supporting arbor adapted to revolve a receiving spool, a pair of smoothing rollers adapted to a tilting movement and to revolve in opposite directions, a pair of associated cone pulleys, a loose belt operable between said pulleys, and in contact therewith and adapted to a lateral movement between said pulleys, a belt shifter adapted to move said belt, through connections with said pressure roller and operating upon the wound up surface of a moving cloth liner, a hand operable control shaft and connected mechanism adapted to tilt said smoothing rollers and simultaneously move said supporting arm whereby tension and direction of a moving cloth liner may be regulated.

ROBERT McCLENATHEN.
JOHN NOALL.

Witness:
H. G. HODGE.